DIRECT WRITING OSCILLOGRAPH

Filed Aug. 12, 1957

INVENTOR.
GEORGE D. PERKINS
BY
Christie, Parker & Hale
ATTORNEYS

United States Patent Office 2,925,310

Patented Feb. 16, 1960

2,925,310

DIRECT WRITING OSCILLOGRAPH

George D. Perkins, Duarte, Calif., assignor to Consolidated Electrodynamics Corporation, Pasadena, Calif., a corporation of California Application August 12, 1957, Serial No. 677,487

5 Claims. (Cl. 346—74)

This invention relates to oscillographs, and more particularly, is concerned with apparatus utilizing a dry process recording of a light beam image.

While oscillographs using a stylus to trace out a pattern on a recording strip in response to an input voltage are well known, the frequency response of such oscillographs is limited because of the inertia of the writing system. High speed oscillographs generally employ a light beam which is deflected in response to an input signal, for example, as by a galvanometer. Photographic techniques have heretofore been employed to record the deflections of the light beam. However, standard photographic techniques are undesirable becasue of the considerable processing of the recording medium required before the record is available.

By the present invention, a direct recording oscillograph is provided utilizing a scanning light beam from a galvanometer or the like. However, the movements of the light beam are recorded by a special recording technique which avoids the complex and time-consuming processes required in the usual photographic developing.

In particular, the present invention utilizes a recording medium capable of receiving and maintaining an electric charge in a small area. Photoconductive material is used to translate the movement of the light beam into an electrical charge image on the recording medium. A special toner responsive to the charge on the recording medium is used to translate the charge image to a visible trace on the recording medium.

For a better understanding of the invention, reference should be had to the accompanying drawing, wherein.

Referring to the figures in detail, the numeral 10 indicates generally a galvanometer which is responsive to an applied input signal. The galvanometer 10 is of a conventional type which operates to deflect a light beam in response to the movements of the galvanometer coil, the galvanometer coil in turn being deflected in response to an input signal.

The light beam from the galvanometer 10 is projected towards a cylindrical lens 12 which focuses the light beam at a point. The galvanometer 10 sweeps the light beam across the longitudinal extent of the cylindrical lens 12, the focused point of light being swept across the surface of a line electrode 14.

Figure 1:
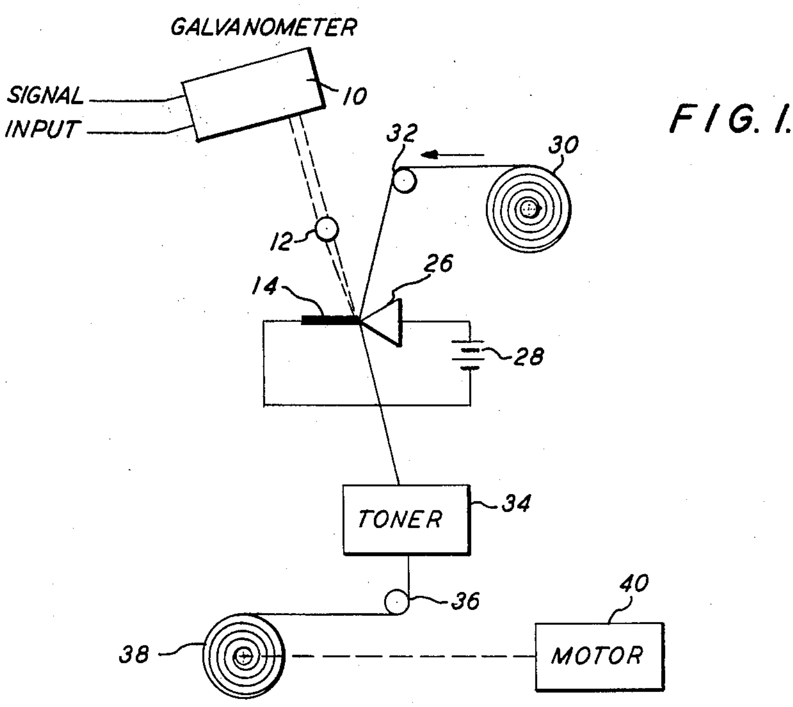
Fig. 1 is a schematic showing of the apparatus of the present invention.
Figure 2:
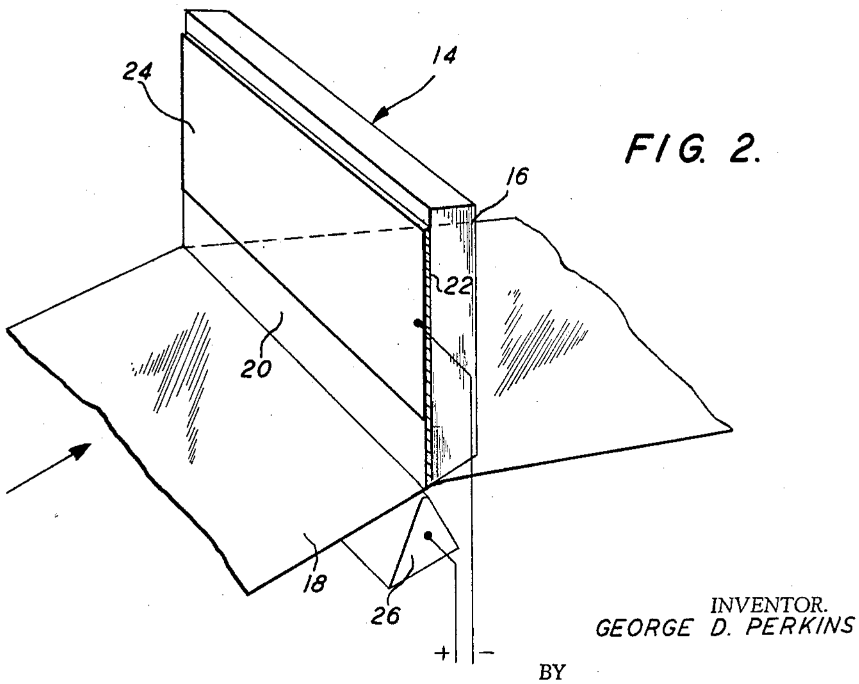
Fig. 2 is a perspective view of the electrode structure.

As best seen in Fig. 2, the line electrode 14 extends the width of the recording medium, indicated generally at 18. The electrode 14 includes a member 16 of a nonconductive material such as glass or plastic. Adjacent the lower edge of the member 16 is coated a layer of photoconductive material 20 on a surface 22 of the member 16 which extends substantially perpendicularly to the surface of the recording medium 18. The layer of conductive material may be of any well known type of material whose resistance varies substantially when it is exposed to light. Examples of suitable photoconductive material are cadmium-selenium, cadmium-sulphur, or other well known photoconductive materials. The upper portion of the photoconductive layer 20, remote from the recording medium 18, is overlayed with a layer of conductive material, such as copper, as indicated at 24.

Positioned opposite the line electrode 14 is another line electrode 26 in the form of an anvil of conductive material, one edge of which is in intimate contact with the recording medium along the line opposite the line electrode 14. A potential is maintained between the conductive layer 24 of the electrode 14 and the electrode 26 by means of a suitable potential source, such as a battery 28.

The recording medium 18 is a continuous strip of dielectric material capable of receiving an electric charge in a small area and retaining this charge for a period of time. A suitable material would be polyethylene or the like. The recording medium is fed from a roll 30 across a guide 32 and thence between the electrodes 14 and 26. As it passes through the two electrodes it is exposed to a potential field produced by the battery 28. When the beam of light from the galvanometer 10 is focused on the photoconductive layer 20, the consequent reduction in resistance in the region of the light beam increases the potential gradient at the surface of the recording medium. As a result, a trace is produced on the recording medium as it moves past the electrodes in the form of a localized charge on the surface of the recording medium.

The recording medium with its charged trace has a toner applied thereto by suitable means indicated generally by the box 34. The toner comprises a powdered ink which is oppositely charged and applied to the surface of the recording medium, the powdered ink adhering to the recording medium along the charged trace. Heat may be applied to the surface of the recording medium to slightly melt the surface and imprison the toner particles to add permanence to the record. The recording medium as it leaves the toner 34 passes over a guide 36 and is wound on a roll 38 driven by a suitable motor drive means 40.

From the above description it will be seen that an improved oscillograph is provided, which is capable of producing a permanent record from a light beam deflected in response to an input signal.

What is claimed is:

1. A recording oscillograph comprising a high resistance dielectric recording medium having a recording surface capable of maintaining an electric charge in a small area for a substantial period of time, conductive means in contact with the recording medium, a thin longitudinal strip of photoconductive material positioned adjacent the recording surface of the recording medium opposite the conductive means, means for directing a light beam at the photoconductive strip, means for sweeping the light beam across the strip in response to an input signal to be recorded, means for maintaining an electric potential between the portion of the strip most remote from the recording surface and the conductive means, the electric field gradient at the surface of the recording medium being increased where the light beam strikes the photoconductive strip and reduces its resistance at the point where the light strikes, means for moving the recording medium past the strip, the strip extending along its length in a direction normal to the direction of movement of the recording medium whereby a charge pattern is reproduced on the moving recording medium in response to deflections of the beam along the extent of the photoconductive strip, and means for applying and fixing an oppositely charged toner to the surface of the recording medium after it passes the strip for imparting a visible trace on the recording medium where it is charged in passing the photoconductive strip.

2. Apparatus as defined in claim 1 wherein the photoconductive strip is spaced from the recording medium to prevent direct contact therebetween, the strip extending the width of the recording medium.

3. Apparatus as defined in claim 2 wherein the phoconductive strip is in the form of a thin layer of photoconductive material on a non-conductive backing, and further including a conductor in contact with the photoconductive layer along the extent of the strip, the photoconductive layer being positioned between the conductor and the surface of the recording medium.

4. Apparatus for applying a charge trace on a dielectric recording medium having a recording surface comprising a pair of electrodes positioned on either side of the recording medium, one of the electrodes being an electrical conductor, the other electrode including a nonconductive strip having a surface extending substantially perpendicular to the recording surface of the recording medium, a layer of photoconductive material on the surface of the non-conductive strip, and a conductor in contact with the photoconductive layer, means for applying a potential between the electrodes, and means for illuminating different portions of the photoconductive layer to decrease the resistance of photoconductive material where the illumination is provided, whereby the potential gradient at the recording surface of the recording medium is increased opposite the point of illumination of the photoconductive layer and a corresponding increased charge is formed on the surface of the recording medium.

5. Apparatus as defined in claim 4 wherein said illuminating means includes a galvanometer for deflecting a light beam in response to an input signal.

References Cited in the file of this patent

UNITED STATES PATENTS

| | | |
|---|---|---|
| 2,035,475 | Hay | Mar. 31, 1936 |
| 2,432,303 | Fox | Dec. 9, 1947 |
| 2,777,745 | McNaney | Jan. 15, 1957 |